United States Patent
Sanders et al.

(10) Patent No.: US 7,925,268 B2
(45) Date of Patent: Apr. 12, 2011

(54) METHOD FOR OPTIMIZING UP-LINK TRANSMISSION POWER FOR A WIRELESS TERMINAL IN A MULTI-CARRIER SYSTEM

(75) Inventors: Chris Sanders, Plano, TX (US); Santhalingam Balasekar, Plano, TX (US); Hang Jin, Plano, TX (US); John Grabner, Plano, TX (US); Tuyen Banh, Murphy, TX (US)

(73) Assignee: Cisco Technology, Inc., San Jose, CA (US)

(*) Notice: Subject to any disclaimer, the term of this patent is extended or adjusted under 35 U.S.C. 154(b) by 769 days.

(21) Appl. No.: 11/503,290

(22) Filed: Aug. 11, 2006

(65) Prior Publication Data

US 2007/0060190 A1    Mar. 15, 2007

Related U.S. Application Data

(60) Provisional application No. 60/717,487, filed on Sep. 14, 2005.

(51) Int. Cl.
*H04W 72/00* (2009.01)
*H04W 40/00* (2009.01)
*H04B 7/00* (2006.01)

(52) U.S. Cl. ..... 455/450; 455/446; 455/447; 455/452.1; 455/512

(58) Field of Classification Search .......... 455/450, 455/446, 452, 447, 512; 370/208
See application file for complete search history.

(56) References Cited

U.S. PATENT DOCUMENTS

| | | | | |
|---|---|---|---|---|
| 5,732,076 | A | * | 3/1998 | Ketseoglou et al. ......... 370/347 |
| 6,650,904 | B1 | * | 11/2003 | Lin et al. ...................... 455/522 |
| 6,681,100 | B1 | * | 1/2004 | Ge ................................ 455/78 |
| 7,039,120 | B1 | * | 5/2006 | Thoumy et al. ............... 375/275 |
| 2002/0111183 | A1 | | 8/2002 | Lundby ........................ 455/522 |
| 2003/0013451 | A1 | * | 1/2003 | Walton .......................... 455/447 |
| 2004/0235510 | A1 | | 11/2004 | Elicegui et al. .............. 455/522 |
| 2005/0026608 | A1 | | 2/2005 | Kallio et al. .................. 455/431 |
| 2006/0009231 | A1 | * | 1/2006 | Emami et al. ............. 455/452.2 |
| 2006/0154684 | A1 | * | 7/2006 | Meiyappan .................. 455/522 |
| 2006/0217073 | A1 | * | 9/2006 | Saitou et al. ............... 455/67.11 |
| 2007/0116021 | A1 | * | 5/2007 | Davis et al. .................. 370/401 |

\* cited by examiner

*Primary Examiner* — Nick Corsaro
*Assistant Examiner* — Manpreet S Matharu

(57) ABSTRACT

Techniques are provided herein to optimize up-link transmission power from a wireless terminal to a base transceiver station in a multicarrier system. A pathloss between the wireless terminal and the base transceiver station is determined. A determination is made if the pathloss is less than or larger than a predetermined value. One or more sub-carriers are assigned to the wireless terminal based on whether the pathloss between the wireless terminal and the base transceiver station is less than or larger than the predetermined value. A power cap command signal is sent from the base transceiver station to the wireless terminal for limiting a maximum allowable power transmitted by the wireless terminal to a predetermined level based on proximity of the one or more sub-carriers to an edge of a frequency band used for up-link transmissions made by the wireless terminal.

17 Claims, 7 Drawing Sheets

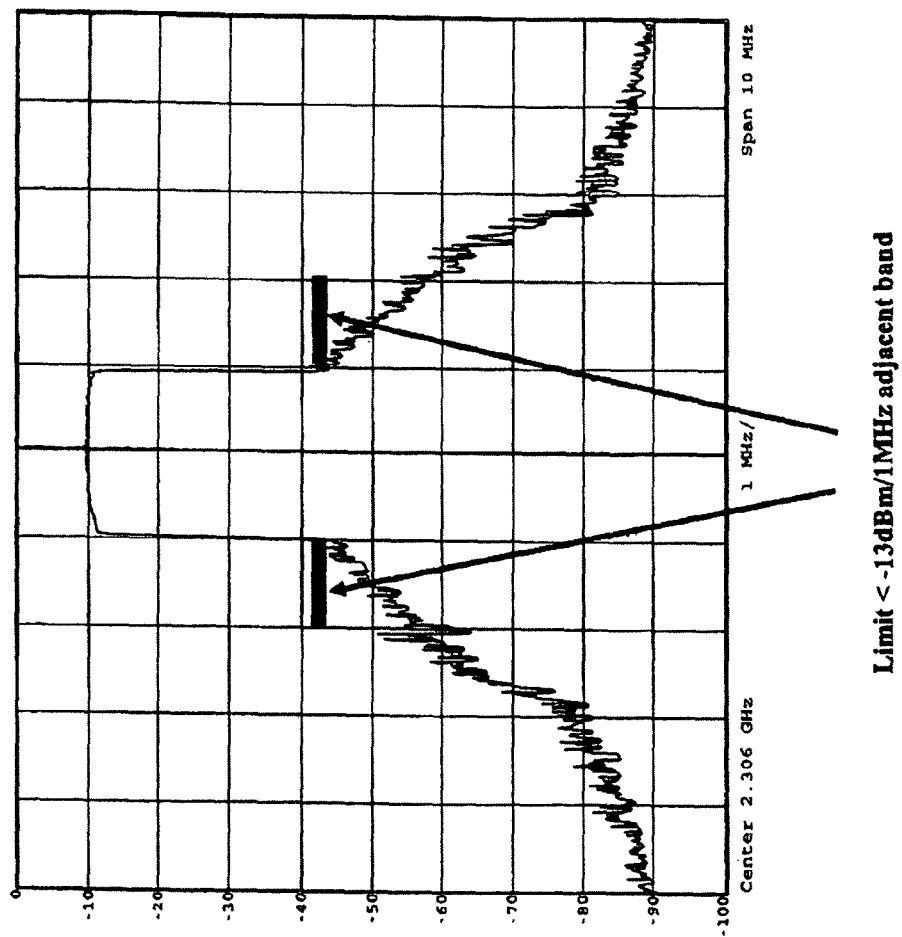

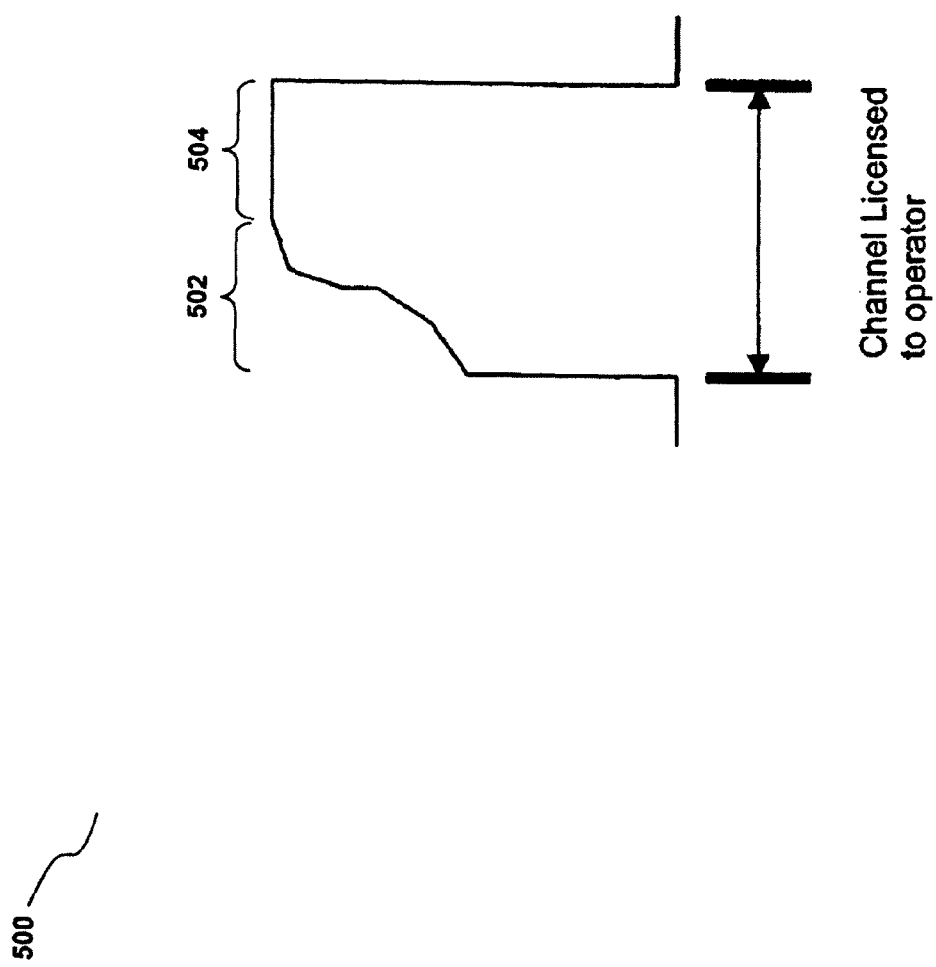

METHOD FOR OPTIMIZING UP-LINK TRANSMISSION POWER FOR A WIRELESS TERMINAL IN A MULTI-CARRIER SYSTEM

CROSS REFERENCE

This application is related to, and claims the benefit of U.S. Provisional Application Ser. No. 60/717,487, which was filed on Sep. 14, 2005 entitled "METHOD FOR OPTIMIZING UP-LINK TRANSMIT POWER FOR A WIRELESS BROADBAND TERMINAL IN A MULTI-CARRIER SYSTEM".

BACKGROUND

The present disclosure generally relates to a wireless telecommunications, and more particularly to a method for optimizing up-link transmission power of a wireless terminal in a multi-carrier system.

One of the features of new generation wireless devices is the faster data transfer rate. For example, in 3G systems, wireless devices are required to have a data transfer rate up to 10 Mb/s, and in future 4G systems, wireless devices may be required to have a data transfer rate up to 1,000 Mb/s. In order to support such a fast rate of data transfer, these wireless communication devices are often designed with broadband capabilities.

As wireless broadband technology advances, many restrictions and limitations are put in place to regulate the use of frequencies. In the United States, the Federal Communications Commission (FCC) puts in place certain regulations that regulate how signals may be transmitted over a spectrum of frequency. For example, FCC has regulations to control the out-of-band spurious emission power in license bands, such as the multipoint multi-channel distribution system (MMDS) and the wireless communication service (WCS) bands. The out-of-band spurious emissions are unwanted frequencies that are outside a designated bandwidth. The out-of-band spurious emissions near a band edge are commonly caused by the inter-modulation distortions from a transmitter. The out-of-band emissions away from the band edge are commonly caused by the noise floor of the transmitter or the combination of the noise floor and the inter-modulation distortions of the transmitter. These regulations limit the allowable output power of the transmitter to a maximum level, in order to ensure the interoperability of various systems in neighboring bands.

There are several conventional solutions for wireless system operators to meet the FCC regulations. The first conventional solution uses a high power linear amplifier to minimize inter-modulation distortions. Advantages of this solution include a higher transmitting power and a lower system link budget. However, the disadvantages of the solution include higher costs, higher power consumption, and a larger size of equipment for sinking heat. This conventional solution is particularly not suitable for a wireless terminal that requires a small size and low manufacturing cost.

The second conventional solution is to use a channel filter for a wireless system to filter out inter-modulation distortions, and to reduce the out-of-band noise floor. This allows the system to have lower out-of-band spurious emissions, but could lead to problems such as high costs, low transmitter power, and fixed frequency channels. In addition, the system may not be able to reduce the out-of-band spurious emissions near the band edge. Thus, this conventional solution is not suitable for a terminal that requires the ability to communicate with various base transceiver stations (BTS) using different frequency channels.

The third conventional solution is to add an extra guard band to the band edge. This allows the system to have a high transmitting power. However, this solution leads to an inefficient use of frequency spectrum, reduction in signal capacity, and an increase in overall system costs.

As such, what is needed in the art of wireless telecommunications technology is a method for optimizing the transmission power for a wireless terminal in a multi-carrier system.

SUMMARY

Described herein are a method for optimizing up-link transmission power from a wireless terminal to a base transceiver station in a multi-carrier system. In one embodiment, the method includes steps of: determining a pathloss between the wireless terminal and the base transceiver station; assigning at least one sub-carrier to the wireless terminal based on the pathloss between the wireless terminal and the base transceiver station; and sending a power cap command signal from the base transceiver station to the wireless terminal for limiting a maximum allowable power transmitted by the wireless terminal to a predetermined level based on the proximity of the sub-carrier to an edge of a frequency band, over which the wireless terminal transmits and receives signals.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2A illustrates a diagram showing up-link transmission power of a wireless terminal at a sub-carrier near a band edge in a multi-carrier system in accordance with one embodiment.

FIG. 5 illustrates a spectral density profile over a frequency band in accordance with one embodiment.

DESCRIPTION

Figure 1A:
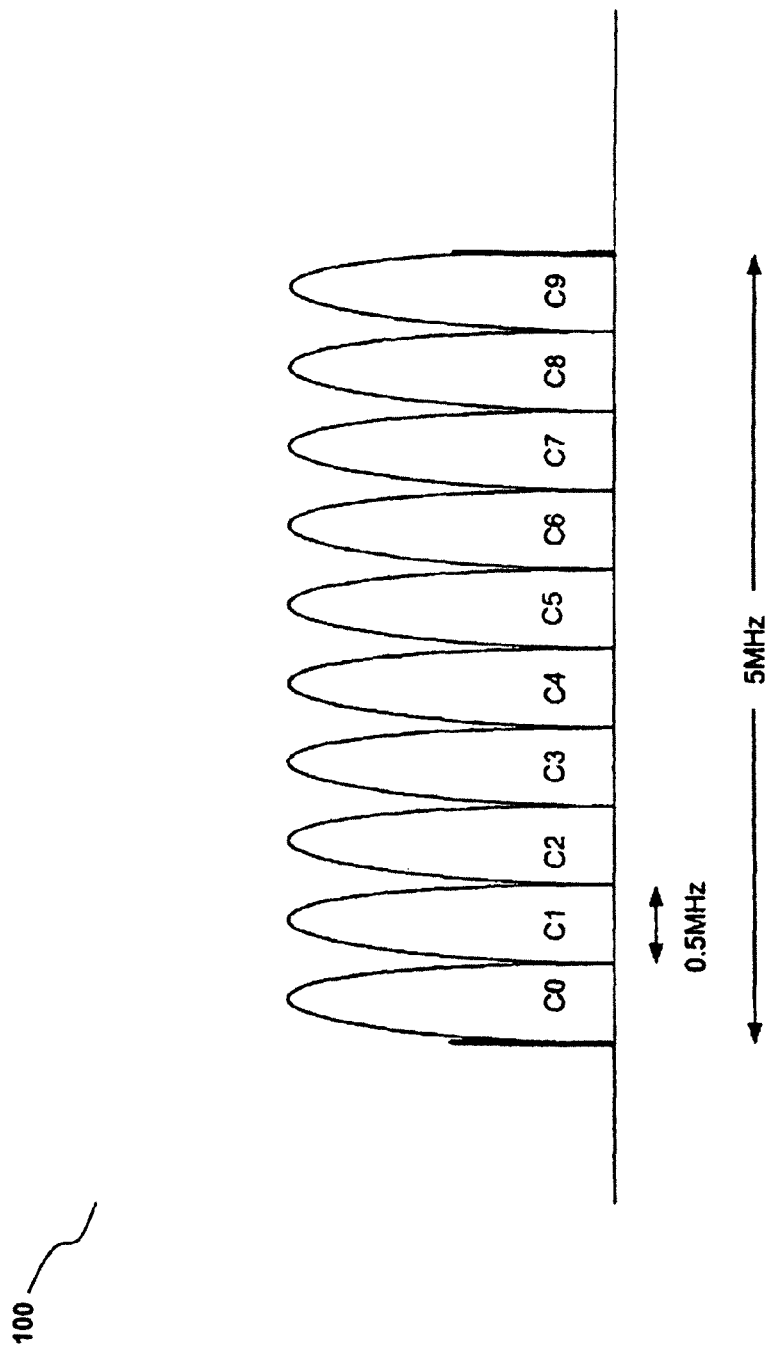
FIG. 1A illustrates a down-link signal comprised of a plurality of sub-carriers in a multi-carrier system in accordance with one embodiment.

FIG. 1A illustrates a down-link signal comprised of a plurality of sub-carriers in a multi-carrier system in accordance with one embodiment. The multi-carrier system includes at least one BTS and at least one wireless terminal, such as customer premise equipment (CPE), a Personal Computer Memory Card International Association (PCMCIA) card, or other wireless devices, for exchanging information there between over a wireless channel. The signal transmitted by the wireless terminal and received by the BTS is referred to as an up-link signal, whereas the signal transmitted by the BTS and received by the wireless terminal is referred to as a down-link signal. In this embodiment, the down-link signal contains ten sub-carriers C0, C1, C2 . . . C9, each of which is 0.5 MHz wide. As a result, the total width of the signal is 5 MHz.

Figure 1B:
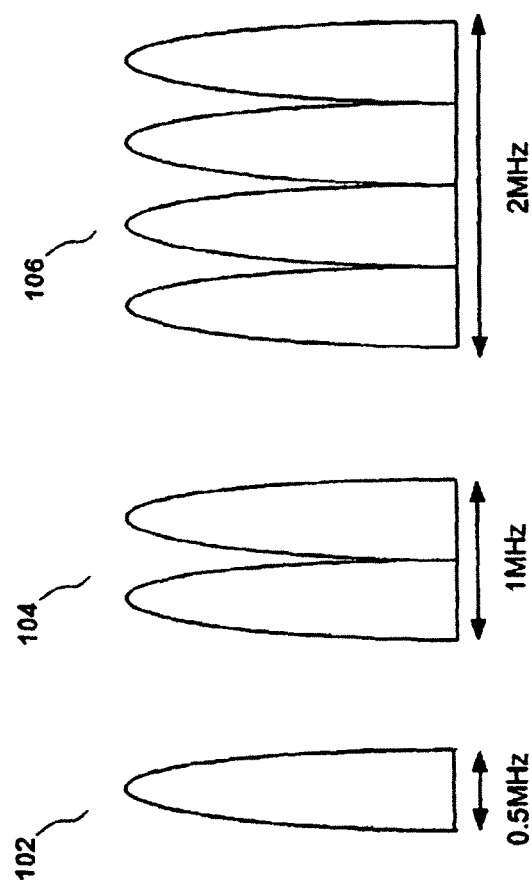
FIG. 1B illustrates various up-link signals, each of which is comprised of one or more sub-carriers, in a multi-carrier system in accordance with one embodiment.

FIG. 1B illustrates various up-link signals, each of which is comprised of one or more sub-carriers, from the wireless terminal to the BTS in the multi-carrier system in accordance with the embodiment. Diagrams 102, 104, and 106 show three examples of up-link signals with various numbers of sub-carriers. The diagram 102 shows an up-link signal with one sub-carrier, thereby forming a 0.5 MHz wide signal. In the diagram 104, the up-link signal contains two sub-carriers, thereby forming a 1 MHz wide signal. In the diagram 106, the up-link signal includes four 0.5 MHz sub-carriers, thereby forming a 2 MHz wide signal. In the multi-carrier system, the width of the up-link signal can be varied depending on the needs of the wireless terminal, as the bandwidth of a signal transmitted by the wireless terminal can be variable or fixed over a period of time.

It is noted that the width of each sub-carrier and the number of sub-carriers each up-link or down-link signal has are not limited to those disclosed in the above embodiment. It is understood that a person skilled in the art can implement a multi-carrier system with a sub-carrier of a different size, and signals with a different number of sub-carriers, without departing from the principles described herein.

Figure 2B:
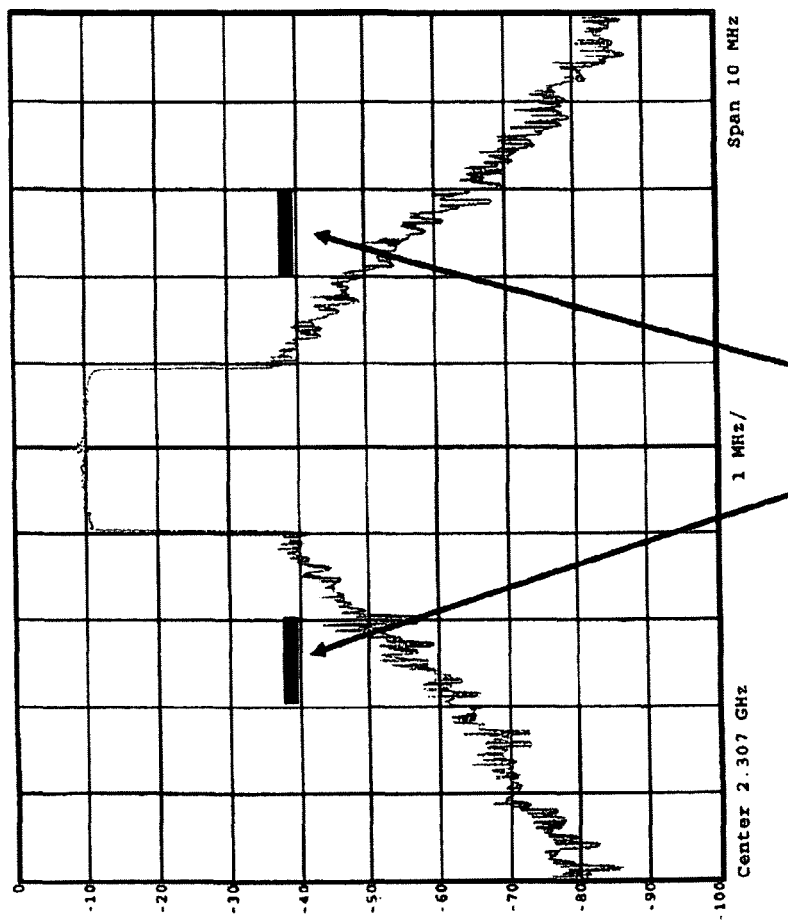
FIG. 2B illustrates a diagram showing up-link transmission power of a wireless terminal at a sub-carrier away from a band edge in a multi-carrier system in accordance with one embodiment.

FIG. 2A illustrates a diagram 200 showing up-link transmission power of a wireless terminal at a sub-carrier near a band edge in a multi-carrier system in accordance with one embodiment. As shown in FIG. 2A, there is no room between the output signal and the FCC mask indicated by the black bars at two sides of the signal. The diagram 200 shows that, as an example, the wireless terminal can transmit a +24 dBm signal with four carriers at an edge of a WCS band (2,305-2,360 MHz), thereby meeting the FCC out-of-band spurious emission requirements. FIG. 2B illustrates a diagram 202 showing up-link transmission power of a wireless terminal at a sub-carrier away from a band edge in a multi-carrier system in accordance with one embodiment. As shown in FIG. 2B, there is room between the output signal and the FCC mask indicated by the black bars at two sides of the signal. The diagram 202 shows that, as an example, the wireless terminal can transmit the signal with a 1 MHz or wider guard band from the band edge at +28 dBm and still meet the FCC out-of-band spurious emission requirements.

In another embodiment where a MMDS band (2,500-2,686 MHz) is used, the wireless terminal can transmit a +27 dBm signal with four sub-carriers at a band edge in a 5.5 MHz channel, and meet the FCC out-of-band spurious emission requirements. In this embodiment, the wireless terminal can again transmit the same four subscarrier signals with a 1 MHz or wider guard band from the band edge at +30 dBm, and still meet the FCC out-of-band spurious emission requirements.

Figure 3:
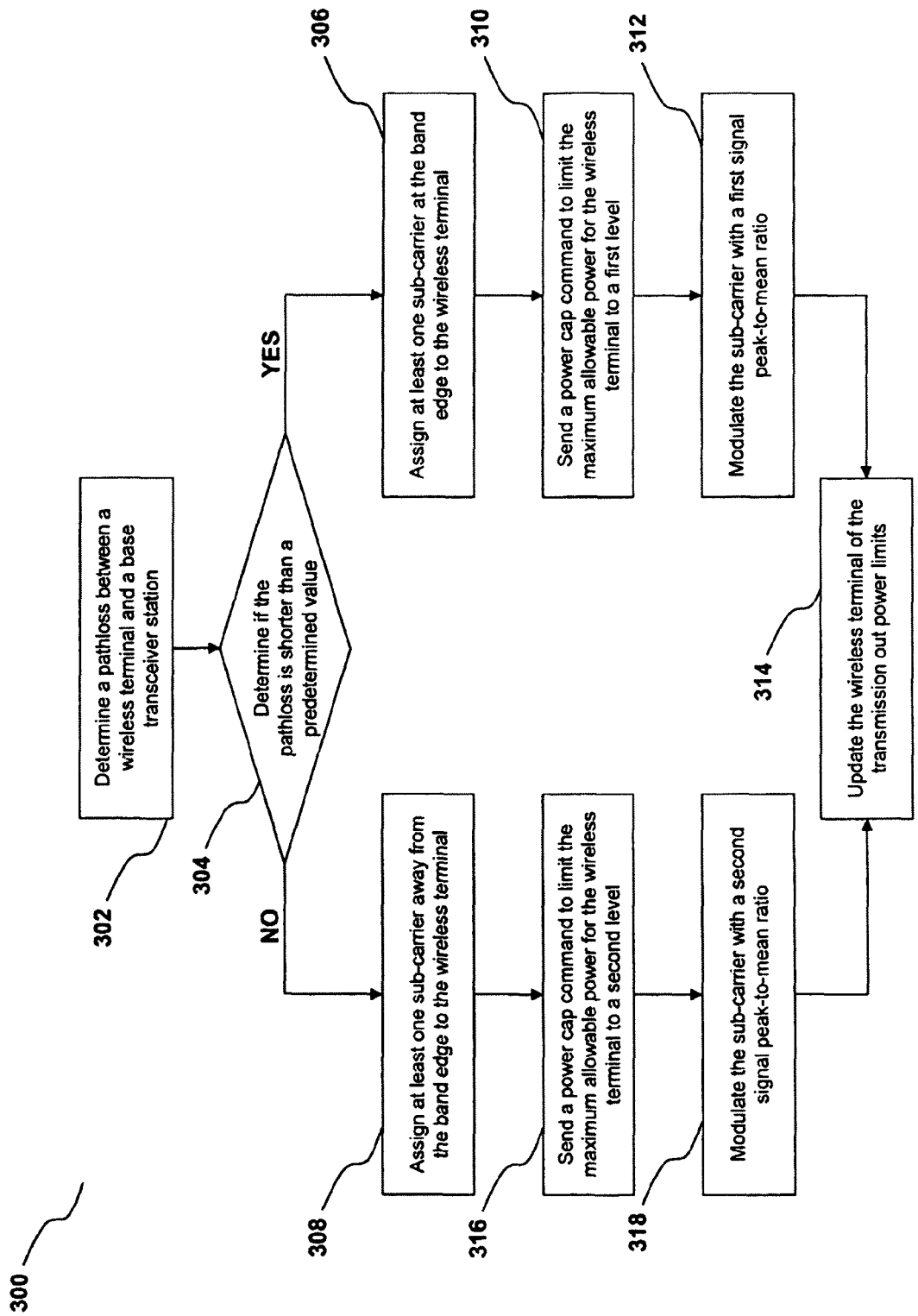
FIG. 3 illustrates a flowchart showing a method for optimizing up-link transmission power from a wireless terminal to a BTS in a multi-carrier system in accordance with one embodiment.

FIG. 3 illustrates a flowchart 300 showing a method for optimizing up-link transmission power from a wireless terminal to a BTS in a multi-carrier system in accordance with one embodiment. In the flowchart 300, a pathloss between the wireless terminal and the BTS is determined in step 302. The BTS is designed with forward and reverse power control schemes, such that the pathloss between the wireless terminal and the BTS can be detected. In step 304, the BTS determines if the pathloss is less than a predetermined value. For example, the predetermined value can be set from 60 to 80 percent of the maximum pathloss allowed for the BTS, or it can be a fixed pathloss from −60 dBm to −80 dBm. If the pathloss is less than the predetermined value, the process flow proceeds to step 306, whereas if the pathloss is larger than the predetermined value, the process flow proceeds to step 308.

Figure 4:
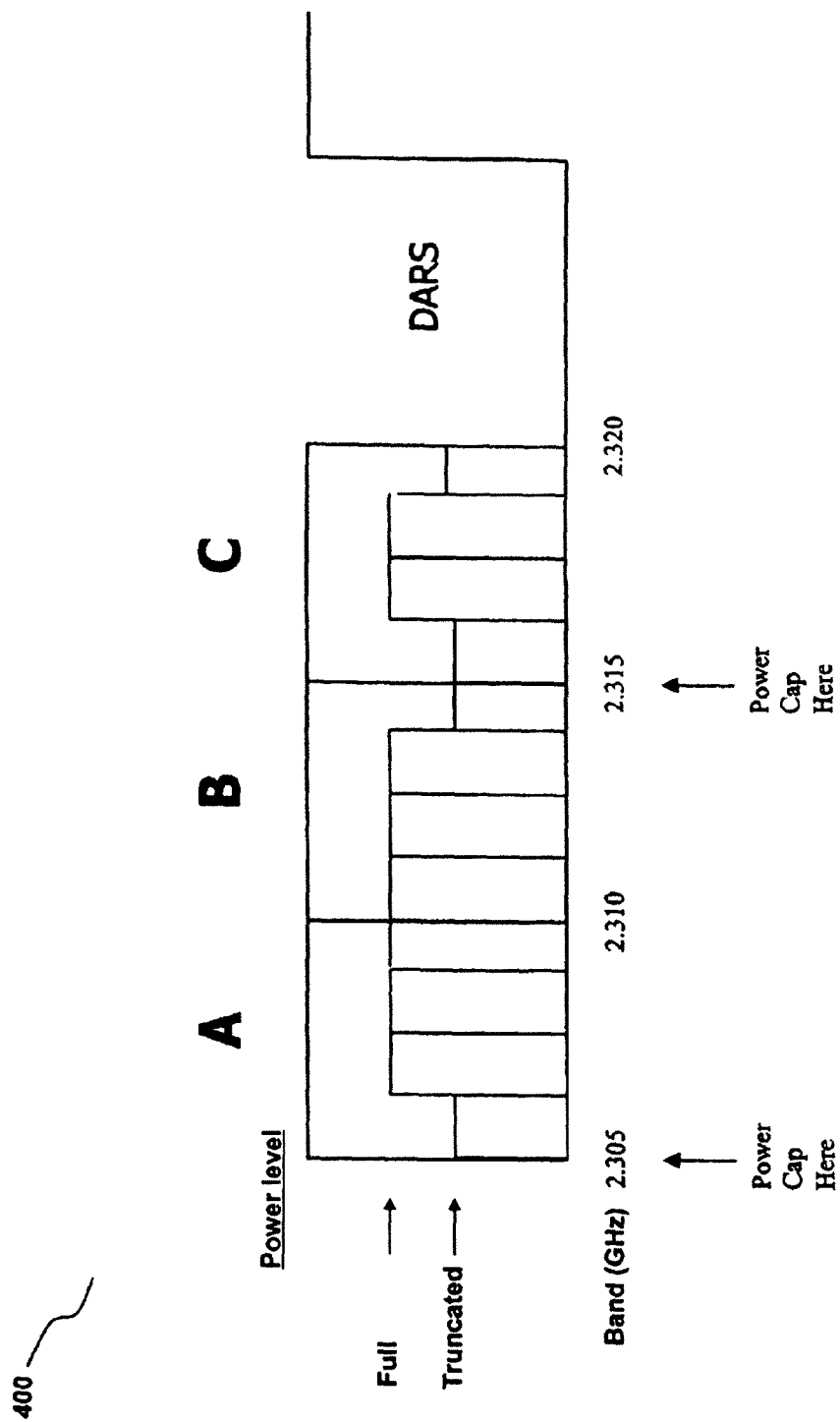
FIG. 4 illustrates an operator owned frequency band in accordance with one embodiment.

In step 306, the BTS assigns at least one sub-carrier at an edge of a frequency band to the wireless terminal. In this embodiment, the "edge of frequency band" or "band edge" refers to an edge of an operator-owned frequency band. Referring to FIG. 4, an operator of a multi-carrier system has the rights to transmit and receive signals over a band of frequency from 2.305 GHz to 2.315 GHz, which contains two WCS bands A and B. The frequency spectrum of WCS band A ranges from 2.305 GHz to 2.310 GHz, and the frequency spectrum of WCS band B ranges from 2.310 GHZ to 2.315 GHz. With the rights to use the consecutive WCS bands A and B, the operator can design a BTS that transmits signals with full power at the border of bands A and B. The band B neighbors a band C, over which the operator has no rights to transmit or receive signals. Thus, the operator needs to design the BTS to transmit signals with lower power at the border of bands B and C.

In step 310, the BTS sends out a power cap command to the wireless terminal for limiting its maximum allowable transmission power to a lower level. The wireless terminals that are closer to the BTS do not need to transmit signals with full power to communicate with the BTS. Thus, the BTS assigns the sub-carriers that are near the owned band edge, and caps the wireless terminal up-link transmission power at a lower maximum allowable power level such as from +24 to +27 dBm.

In step 312, a modulation scheme with a low signal peak-to-mean ratio is assigned for the sub-carriers at the band edge. A signal with a low peak-to-mean ratio drives a power amplifier less intensively, thereby generating less amount of out-of-band emission. In step 314, the transmission power is limited and the modulation schemes of the wireless terminal are updated, such that the allocation of sub-carriers for the wireless terminals can be optimized based on their pathloss with respect to the BTS.

In step 308, the BTS assigns at least one sub-carrier away from an edge of a frequency band to the wireless terminal, when the pathloss between the wireless terminal and the BTS is larger than the predetermined value. For example, the sub-carrier assigned is away from the edge by at least 20 percent of the width of the operator owned frequency band.

In step 316, the BTS sends a power cap command to the wireless terminal for limiting its maximum allowable transmission power to a higher level. The wireless terminals that are further away from the BTS need to transmit signals with more power than those close to the BTS do. Thus, the BTS assigns the sub-carriers that are away from the band edge, and caps the wireless terminal up-link transmission power at a higher maximum allowable power level such as from +28 to +30 dBm.

In step 318, a modulation scheme with a high signal peak-to-mean ratio is assigned for the sub-carriers away from the band edge. Although a signal with a high peak-to-mean ratio drives a power amplifier, it will not generate a significant amount of out-of-band emission, as the sub-carrier is away from the band edge. The process flow then proceeds to step 314 where the transmission power limits and the modulation scheme of the wireless terminal are updated, such that allocation of sub-carriers for the wireless terminals can be optimized based on their pathloss with respect to the BTS.

In this embodiment, the power cap command can indicate a fixed cap or a power spectral density profile. FIG. 5 illustrates a spectral density profile 500 over a frequency band utilized by a multi-carrier system. The operator has the rights to transmit signals over sub-carriers on the right side of the frequency band, but do not have such rights to sub-carriers on the left side of the band. The height of the profile 500 at a specific frequency represents the maximum allowable transmission power at that frequency. As shown in the figure, the sub-carriers in section 502 have a lower maximum allowable transmission power, starting from the lowest at the left edge, with its value gradually stepping up until the border between sections 502 and 504. The sub-carriers in the section 504 have a relatively stable allowable power distribution, as they are away from the band edge. The wireless terminal will adjust its signal transmission power based on its assigned sub-carrier and the spectral density profile.

The proposed method is able to optimize the up-link transmission power based on a pathloss between a wireless terminal and a BTS in a multi-carrier system. No high power amplifier, channel filter or extra guard band is needed in order for the multi-carrier system to meet the out-of-band emission requirements. As such, the proposed method allows the BTS of the multi-carrier system to be designed in a simple and cost-effective way.

The above illustration provides many different embodiments or embodiments for implementing different features for the techniques described herein. Specific embodiments of components and processes are described for clarity. These are, of course, merely embodiments and are not intended to limit the techniques described herein from the broader scope of the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   at a base transceiver station, determining a pathloss between a wireless terminal and the base transceiver station using forward and reverse power control schemes to determine the pathloss;
   determining if the pathloss is less than or greater than a predetermined value;
   assigning one or more sub-carriers of a frequency band used for up-link transmissions made by the wireless terminal based on whether the pathloss is less than or greater than the predetermined value, wherein assigning comprises assigning sub-carriers further away from an edge of the frequency band when the pathloss is less than the predetermined value and assigning sub-carriers closer to the edge of the frequency band when the pathloss is greater than the predetermined value;
   determining proximity of the one or more sub-carriers to the edge of the frequency band;
   assigning a power level to the one or more sub-carriers based on said proximity;
   sending a power cap command signal from the base transceiver station to the wireless terminal, wherein sending comprises sending the power cap command signal that is configured to limit a maximum allowable power transmitted by the wireless terminal to a predetermined level based on proximity of the one or more sub-carriers to the edge of the frequency band of the wireless terminal such that the power cap command signal limits the maximum allowable power to a higher maximum allowable power for sub-carriers that are away from the edge of the frequency band than for sub-carriers that are closer the edge of the frequency band.

2. The method of claim 1, wherein assigning comprises assigning the one or more sub-carriers away from the edge of the frequency band by at least a predetermined percentage of a width of the frequency band if the pathloss between the wireless terminal and the base transceiver station is greater than the predetermined value.

3. The method of claim 2, wherein assigning comprises assigning the sub-carriers at the edge of the frequency band when the predetermined value is less than 80 percent of the maximum pathloss allowed for the base transceiver station.

4. The method of claim 2, wherein sending comprises sending the power cap command signal that is configured to cap the predetermined level of the maximum allowable power to a lower maximum allowable power level when the proximity of the one or more sub-carriers is closer to the edge of the frequency band.

5. The method of claim 4, further comprising setting the predetermined level of the maximum allowable power to a value within a first range when the wireless terminal is assigned to one or more sub-carriers at the edge of the frequency band and setting the predetermined level of the maximum allowable power for the wireless terminal to a value within a second range when the wireless terminal is assigned to the one or more sub-carriers away from the edge of the frequency band.

6. The method of claim 1, further comprising modulating the one or more sub-carriers at the edge of the frequency band with a first signal peak-to-mean ratio.

7. The method of claim 6, further comprising modulating the one or more sub-carriers away from the edge of the frequency band with a second signal peak-to-mean ratio that is greater than the first signal peak-to-mean ratio.

8. The method of claim 1, further comprising updating at least one of the predetermined level of the maximum allowable power and a modulation scheme at the wireless terminal.

9. A method comprising:
   at a base transceiver station, determining a pathloss between a wireless terminal and the base transceiver station using forward and reverse power control schemes to determine the pathloss;
   determining if the pathloss is less than or greater than a predetermined value;
   assigning one or more sub-carriers of a frequency band used for up-link transmissions to wireless terminals based on the pathloss between the wireless terminals and the base transceiver station, wherein assigning comprises assigning sub-carriers closer to an edge of the frequency band to wireless terminals when the pathloss between the wireless terminals and the base transceiver station is less than a predetermined value and assigning sub-carriers further away from the edge by at least a predetermined percentage of a width of the frequency band to wireless terminals when the pathloss between the wireless terminals and the base transceiver station is greater than the predetermined value;
   determining proximity of the one or more sub-carriers to the edge of the frequency band;
   assigning a power level to the one or more sub-carriers based on said proximity;
   sending a power cap command signal from the base transceiver station to the wireless terminal, wherein sending comprises sending the power cap command signal that is configured to indicate a power spectral density, and wherein a predetermined level of a maximum allowable power varies over the frequency band based on the power spectral density indicated by the power cap command and such that the power cap command signal limits the maximum allowable power to a higher maximum allowable power for sub-carriers that are further away from the edge of the frequency band than for sub-carriers that are closer to the edge of the frequency band.

10. The method of claim 9, wherein assigning comprises assigning the sub-carriers at the edge of the frequency band when the predetermined value is less than 80 percent of the maximum pathloss allowed for the base transceiver station.

11. The method of claim 9, wherein sending comprises sending the power cap command signal that is configured to cap the predetermined level of the maximum allowable power to a lower maximum allowable power level when the proximity of the one or more sub-carriers is closer to the edge of the frequency band.

12. The method of claim 11, further comprising setting the predetermined level of the maximum allowable power to a value within a first range when the wireless terminals are assigned to one or more sub-carriers at the edge of the frequency band and setting the predetermined level of the maximum allowable power for the wireless terminals to a value within a second range when the wireless terminals are assigned to the one or more sub-carriers away from the edge of the frequency band.

13. The method of claim 9, further comprising modulating the at least one sub-carrier at the edge of the frequency band with a first signal peak-to-mean ratio.

14. The method of claim 13, further comprising modulating the at least one sub-carrier away from the edge of the frequency band with a second signal peak-to-mean ratio that is greater than the first signal peak-to-mean ratio.

15. The method of claim 9, further comprising updating at least one of the predetermined level of the maximum allowable power and a modulation scheme at the wireless terminals.

16. The method of claim 1, further comprising determining if the pathloss is less than or greater than the predetermined value between −60 dBm and −80 dBm.

17. The method of claim 9, further comprising determining if the pathloss is less than or greater than the predetermined value between −60 dBm and −80 dBm.

* * * * *